United States Patent
Nakatani

(10) Patent No.: US 9,385,761 B2
(45) Date of Patent: Jul. 5, 2016

(54) TRANSMISSION DEVICE, AND FENDER PROVIDED THEREWITH

(71) Applicant: The Yokohama Rubber Co., LTD., Minato-ku, Tokyo (JP)

(72) Inventor: Koji Nakatani, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/407,950

(22) PCT Filed: May 13, 2013

(86) PCT No.: PCT/JP2013/063267
§ 371 (c)(1),
(2) Date: Dec. 13, 2014

(87) PCT Pub. No.: WO2013/187162
PCT Pub. Date: Dec. 19, 2013

(65) Prior Publication Data
US 2015/0140942 A1    May 21, 2015

(30) Foreign Application Priority Data
Jun. 13, 2012   (JP) .................................. 2012-133428

(51) Int. Cl.
| | | |
|---|---|---|
| *H04B 1/034* | (2006.01) |
| *H04B 1/03* | (2006.01) |
| *B63B 59/02* | (2006.01) |
| *H01Q 1/34* | (2006.01) |
| *H01Q 7/00* | (2006.01) |
| *H04B 13/02* | (2006.01) |

(Continued)

(52) U.S. Cl.
CPC *H04B 1/03* (2013.01); *B63B 59/02* (2013.01); *H01Q 1/34* (2013.01); *H01Q 7/00* (2013.01); *H04B 13/02* (2013.01); *B63B 49/00* (2013.01); *B63B 2059/025* (2013.01); *E02B 3/26* (2013.01)

(58) Field of Classification Search
CPC ............................ G08B 23/00; G08B 6359/02
USPC ............... 455/91, 115.1, 128, 129, 103, 90.3; 340/442, 445, 447, 984; 114/219
See application file for complete search history.

(56) References Cited

U.S. PATENT DOCUMENTS

| | | | |
|---|---|---|---|
| 3,500,209 A | | 3/1970 | Fletcher et al. |
| 6,486,800 B1 * | | 11/2002 | Hattori .................... B63B 59/02 235/384 |
| 7,701,326 B2 * | | 4/2010 | Nakatani ............. B60C 23/0484 340/442 |

(Continued)

FOREIGN PATENT DOCUMENTS

| | | |
|---|---|---|
| EP | 2 627 011 | 8/2013 |
| EP | 2 639 880 | 9/2013 |

(Continued)

OTHER PUBLICATIONS

International Search Report for International Application No. PCT/JP2013/063267 dated Jul. 30, 2013, 2 pages, Japan.

*Primary Examiner* — Sonny Trinh
(74) *Attorney, Agent, or Firm* — Thorpe North & Western

(57) ABSTRACT

A transmission device attached to a fender and for transmitting information via radio waves includes a conductor plate disposed between the water surface and an antenna within a transmission unit of the transmission device. Radio waves that reach a reception antenna by reflecting off the water surface, an object floating on water, or the bottom of water are reflected by the conductor plate.

14 Claims, 15 Drawing Sheets

(51) Int. Cl.
*E02B 3/26* (2006.01)
*B63B 49/00* (2006.01)

(56) References Cited

U.S. PATENT DOCUMENTS

| | | | |
|---|---|---|---|
| 8,611,831 B2 * | 12/2013 | Nakatani | G01D 3/10 340/445 |
| 2008/0143512 A1 * | 6/2008 | Wakisaka | H04W 74/0808 340/504 |
| 2010/0070118 A1 | 3/2010 | Yamada et al. | |
| 2013/0167999 A1 | 7/2013 | Nakatani et al. | |
| 2013/0189938 A1 | 7/2013 | Nakatani et al. | |
| 2013/0229275 A1 | 9/2013 | Nakatani | |
| 2013/0231063 A1 | 9/2013 | Nakatani | |

FOREIGN PATENT DOCUMENTS

| | | | |
|---|---|---|---|
| EP | 2 639 963 | 9/2013 | |
| EP | 2863476 A1 * | 4/2015 | ............... H01Q 1/34 |
| JP | H06-206588 | 7/1994 | |
| JP | H06-0206588 | 7/1994 | |
| JP | H06-206588 A | 7/1994 | |
| JP | H11-072554 | 3/1999 | |
| JP | H11-072554 A | 3/1999 | |
| JP | 2012-105061 | 5/2012 | |
| WO | 2008/053887 A1 | 5/2008 | |
| WO | WO 2012/046486 | 4/2012 | |
| WO | 2012/063527 A1 | 5/2012 | |
| WO | WO 2012/063526 | 5/2012 | |
| WO | WO 2012-063527 | 5/2012 | |
| WO | WO 2012/063527 | 5/2012 | |
| WO | WO 2012/073973 | 6/2012 | |

* cited by examiner

| | FENDER 1A | FENDER 1B | FENDER 1C | FENDER 1D |
|---|---|---|---|---|
| WITHOUT CONDUCTOR PLATE | -30.0dBm | -30.0dBm | -27.9dBm | -25.0dBm |
| WITH CONDUCTOR PLATE | -26.4dBm | -27.8dBm | -23.5dBm | -21.7dBm |
| DIFFERENCE | 3.6dBm | 2.2dBm | 4.4dBm | 3.3dBm |

TRANSMISSION DEVICE, AND FENDER PROVIDED THEREWITH

TECHNICAL FIELD

The present technology relates to a transmission device which, even in a case of being attached to an object floating on water such as a fender, is not easily influenced on a reception side by the reflecting of radio waves off the water surface, and to a fender provided with the transmission device.

BACKGROUND

In the related art, a transmission device is known which uses a transmission unit provided with a sensor to transmit detection values of physical states, such as temperature, humidity, or pressure, detected using a sensor to a separate location, via radio waves.

For example, a transmission device is known which is able to monitor the air pressure of an inner section in a pneumatic fender, which is used when a ship is moored to a quay on a shore or another ship, without touching the pneumatic fender by detecting the air pressure of an inner section using a sensor of a transmission unit, using the transmission unit to transmit the detected value to a separate location via radio waves, and receiving the detected value.

As an example of a system which uses a fender provided with such a sensor, a ship maneuvering and ship mooring support system disclosed in WO2008/053887 JP is known. In this system, when a plurality of fenders are attached to a side surface of a ship and two ships are moored to each other, it is possible to maneuver a ship while monitoring the internal air pressure of the fenders. For example, in a case where four fenders 1A, 1B, 1C, and 1D are attached to a side surface of a ship Sp1 as illustrated in FIG. 17 to FIG. 19, transmission units 100 stored in a case 11 of a transmission device 10 is provided in inner sections of each of the fenders 1A, 1B, 1C, and 1D, the air pressure of the inner sections of the fenders is detected by sensors provided in the transmission units 100 and the information on the detected air pressure is transmitted as digital data. The data which is transmitted from each of the fenders 1A, 1B, 1C, and 1D is received by a reception antenna 2 which is attached to the side of a control room. Here, the distances between each of the fenders 1A, 1B, 1C, and 1D and the reception antenna 2 are respectively La, Lb, Lc, and Ld (m).

The ship Sp1 and the fenders 1A, 1B, 1C, and 1D float on the ocean, and it goes without saying that the sea surface moves up and down according to the waves. For this reason, as illustrated in FIG. 20, a distance Hs between transmission units 100 of each of the fenders 1A, 1B, 1C, and 1D and the sea surface changes according to up and down changes Hv in the sea surface and, in accordance with this change, the strength of the received radio waves from each of the fenders 1A, 1B, 1C, and 1D in the reception antenna 2 is greatly changed. That is, in the radio waves radiated from the transmission units 100 provided in the fenders 1, there are waves which reach the reception antenna 2 as direct waves DW, waves which reach the reception antenna 2 as reflected waves RW1a, RW1b, RW2, and RW3, and waves which do not reach the reception antenna 2. For example, there are cases where the reflected waves which include the reflected wave RW1a reflected off a sea surface 5 at the lowest point and the reflected wave RW1b reflected off a highest sea surface 5a reach the reception antenna 2 and cases where the reflected waves do not reach the reception antenna 2. Further, when the reflected waves reach the reception antenna 2, the reception electric field strength may be increased or decreased due to interference with the direct waves DW. In addition, the reflected wave RW2 which is reflected off a floating object 6 present in seawater 4 does not reach the reception antenna 2 due to being attenuated by the seawater, and the reflected wave RW3 which is reflected off a seabed 3 also does not reach the reception antenna 2 due to being attenuated by the seawater.

FIG. 21 to FIG. 24 show measurement values of the reception electric field strength from each of the fenders 1A, 1B, 1C, and 1D at this time. In the drawings, the curve D is a distance between the mooring and the ship Sp1, and RSSI is the reception electric field strength. As shown in these drawings, the reception electric field strength from each of the fenders 1A, 1B, 1C, and 1D greatly changes according to changes in the height of the sea surface due to the waves, the reception electric field strength from each of the fenders 1A, 1B, 1C, and 1D may fall below the reception limit strength in the reception antenna 2, and it may not be possible to receive the data.

SUMMARY

The present technology provides a transmission device wherein it is possible to obtain a receivable reception electric field strength at a reception antenna even if the sea surface height changes due to waves when the transmission device is attached to an object floating on water such as a fender and a fender provided with said transmission device.

The present technology proposes a transmission device attached to an object floating in water and for transmitting predetermined information via radio waves, the transmission device being provided with a conductor plate disposed at a predetermined boundary plane between an antenna, which radiates transmission radio waves, and a water surface.

According to the present technology, the radio waves which reach the reception antenna by being reflected off the water surface, an object floating on water, or the bottom of water are all reflected using a conductor plate. Thus, fluctuations in the reception electric field strength in the reception antenna which occur in accordance with the passage of time due to fluctuations in the water surface height are eliminated.

In addition, the present technology proposes a fender provided with the transmission device described above.

According to the present technology, the radio waves which reach the reception antenna by being reflected off the water surface, an object floating on water, or the bottom of water after being radiated from the transmission device of the fender are all reflected using a conductor plate. Thus, fluctuations in the reception electric field strength in the reception antenna which occur in accordance with the passage of time due to fluctuations in the water surface height are eliminated.

For the transmission device of the present technology, the radio waves which reach the reception antenna by being reflected off the water surface, an object floating on water, or the bottom of water are all reflected using a conductor plate. Thus, fluctuations in the reception electric field strength in the reception antenna which occur in accordance with the passage of time due to fluctuations in the water surface height are eliminated, and it is possible to constantly obtain a stable reception electric field strength.

DETAILED DESCRIPTION

Hereinafter, an embodiment of the present technology is described with reference to the accompanying drawings.

Figure 1:
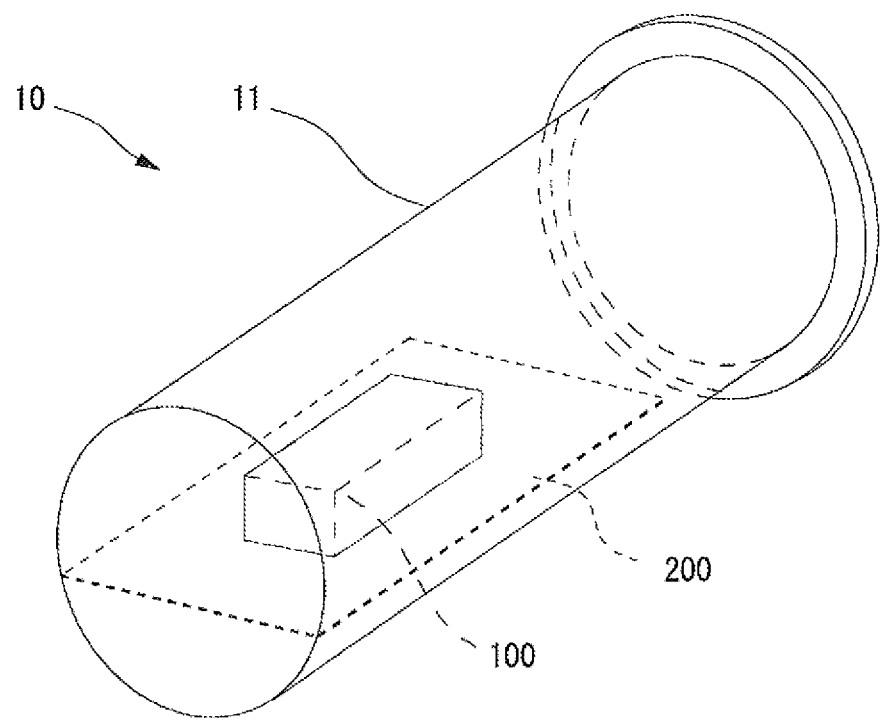
FIG. 1 is an external view which illustrates a transmission device in an embodiment of the present technology.
Figure 2:
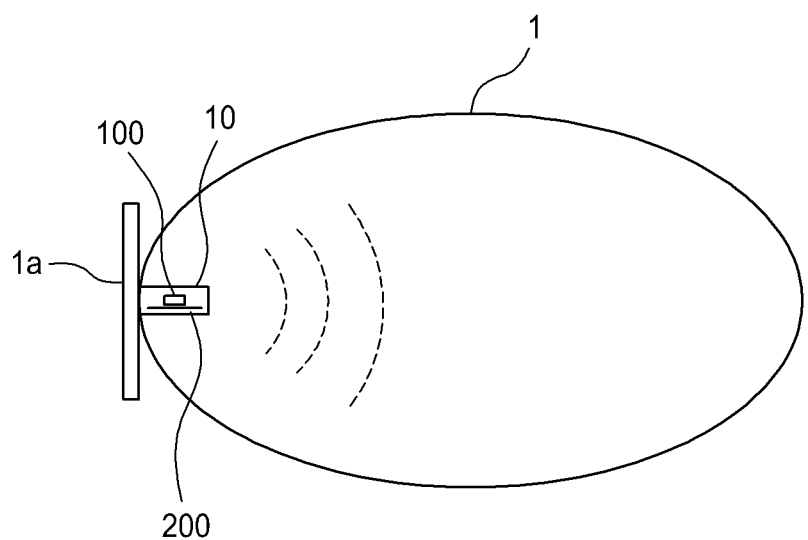
FIG. 2 is a diagram which illustrates a fender which is provided with the transmission device in the embodiment of the present technology.
Figure 3:
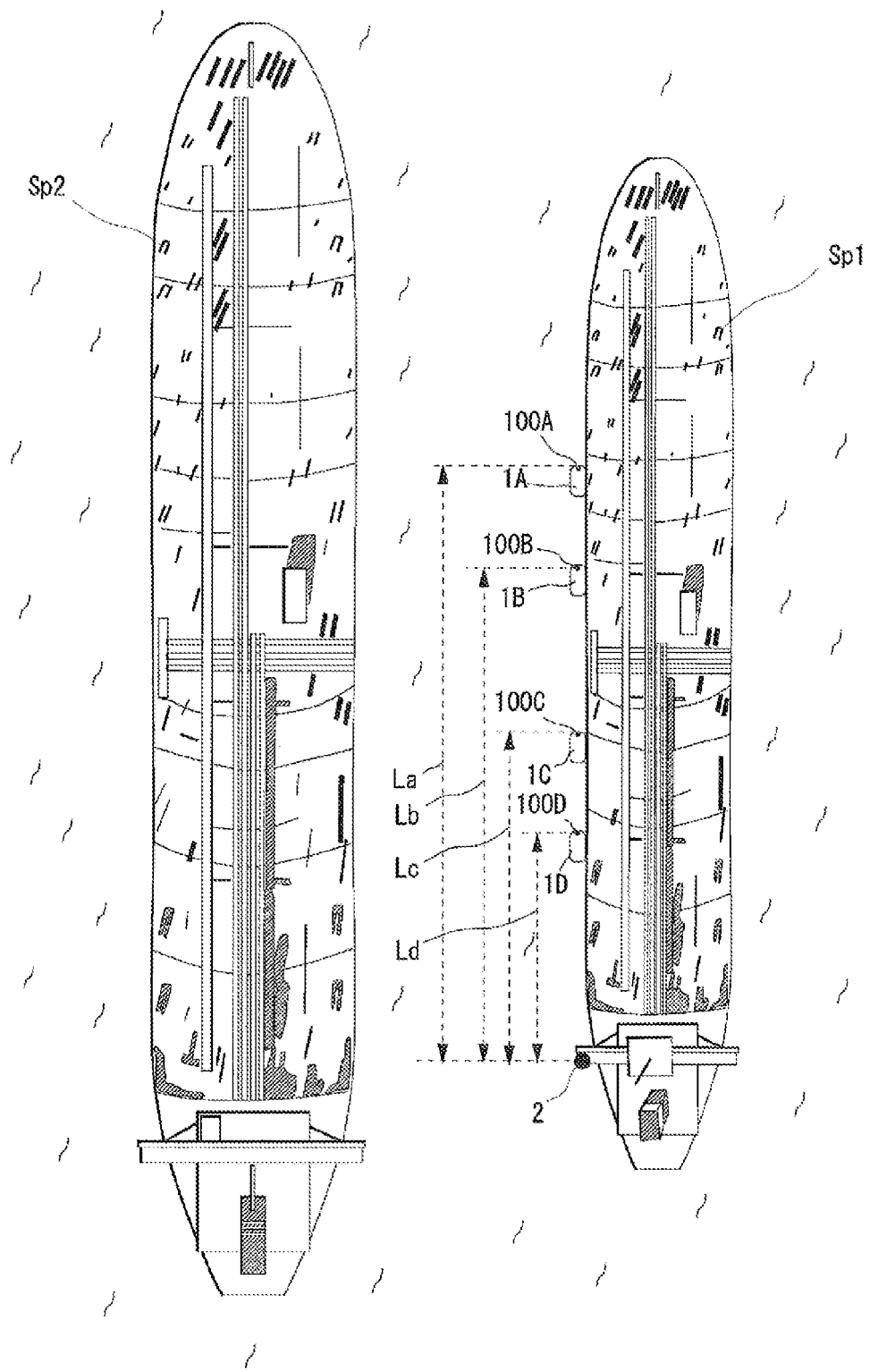
FIG. 3 is a diagram which illustrates a ship which is provided with the fender in the embodiment of the present technology.
Figure 4:
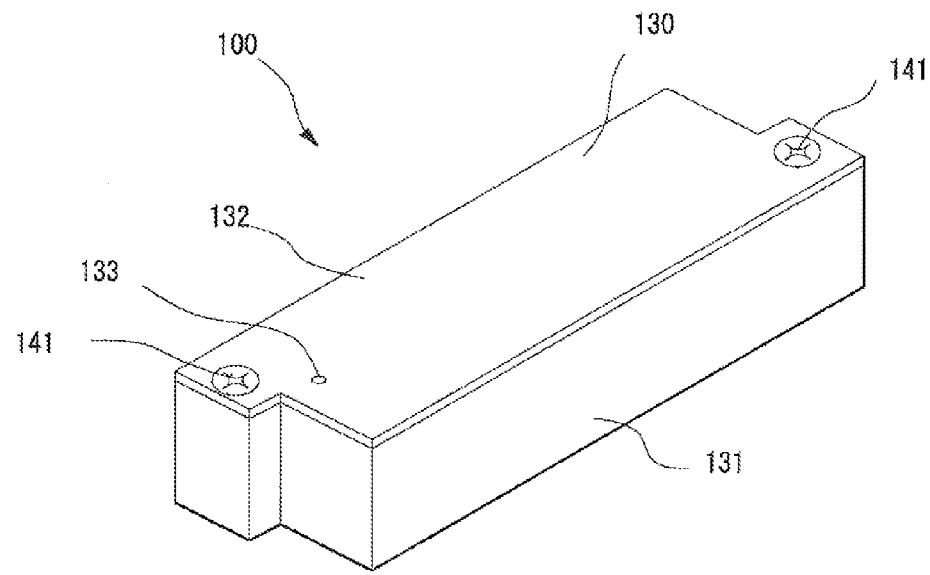
FIG. 4 is an external perspective view which illustrates a transmission unit in the embodiment of the present technology.
Figure 5:
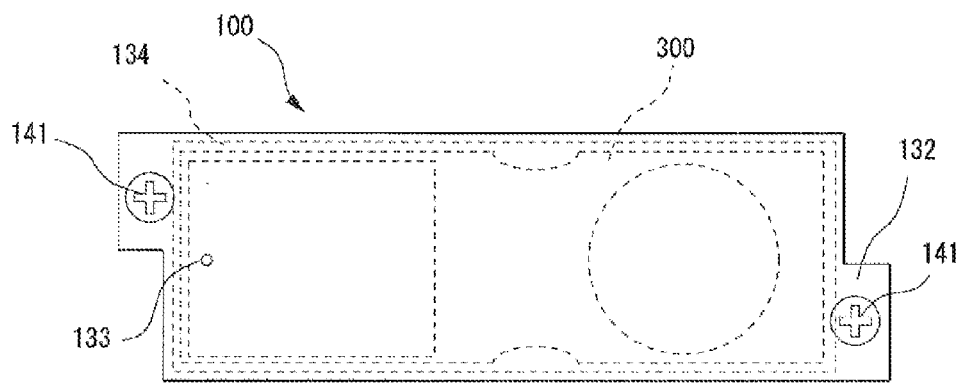
FIG. 5 is a plan view which illustrates the transmission unit in the embodiment of the present technology.
Figure 6:
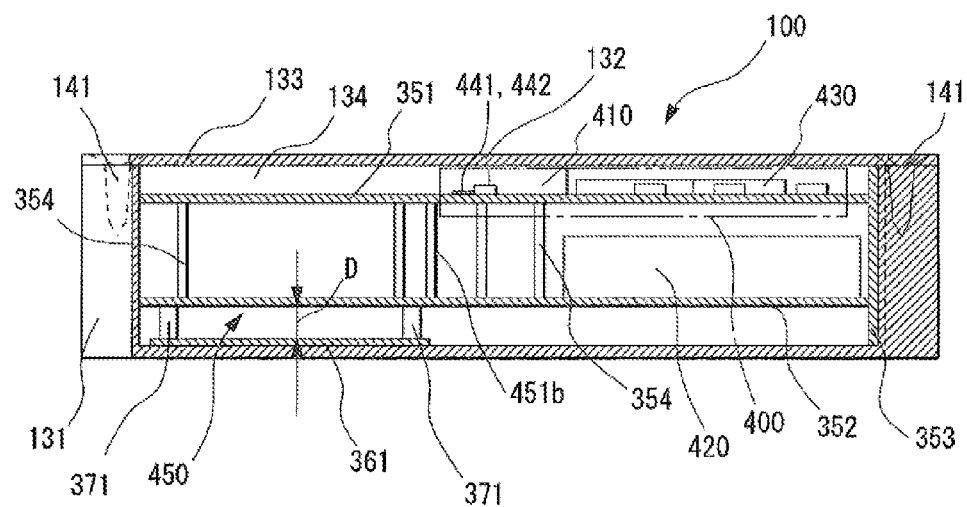
FIG. 6 is a side surface cross sectional diagram which illustrates the transmission unit in the embodiment of the present technology.
Figure 7:
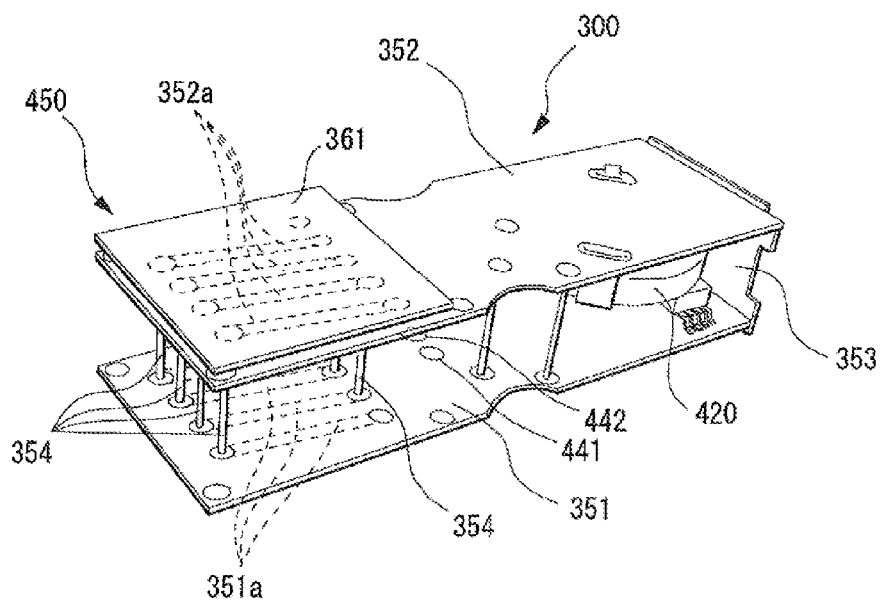
FIG. 7 is an external perspective view which illustrates a main unit body in the embodiment of the present technology.
Figure 8:
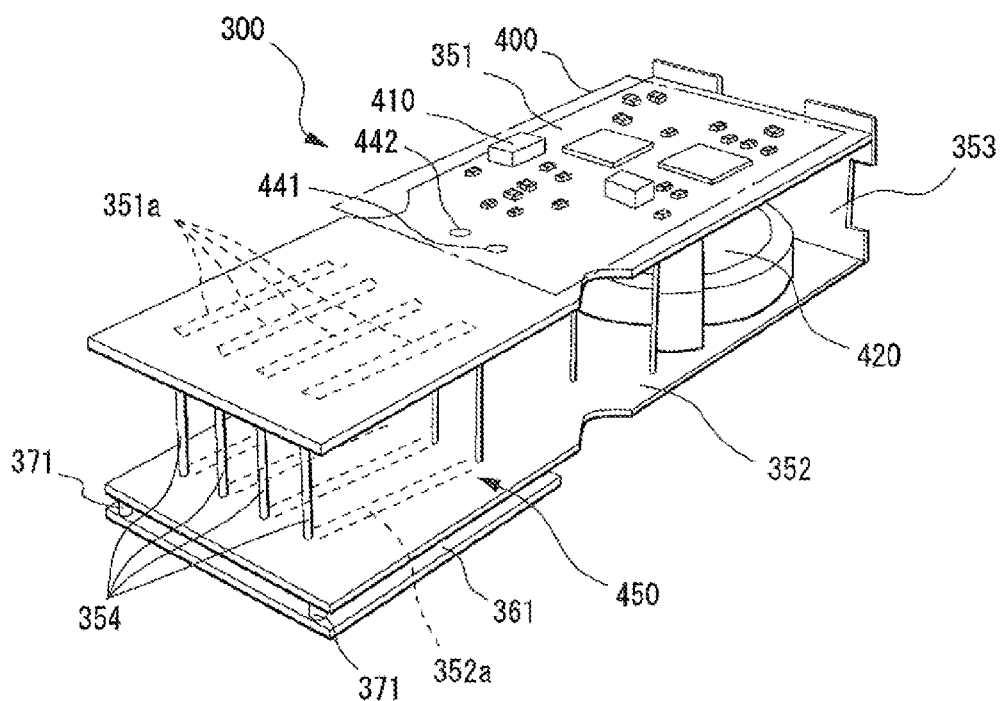
FIG. 8 is an external perspective view which illustrates the main unit body in the embodiment of the present technology.
Figure 9:
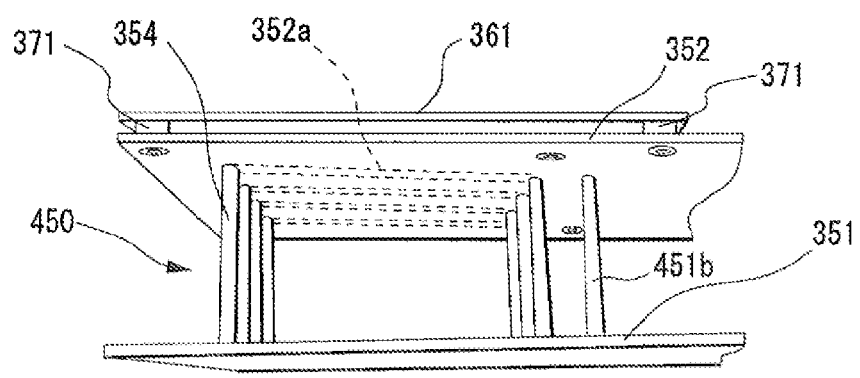
FIG. 9 is an external perspective view which illustrates main sections of the main unit body in the embodiment of the present technology.
Figure 10:
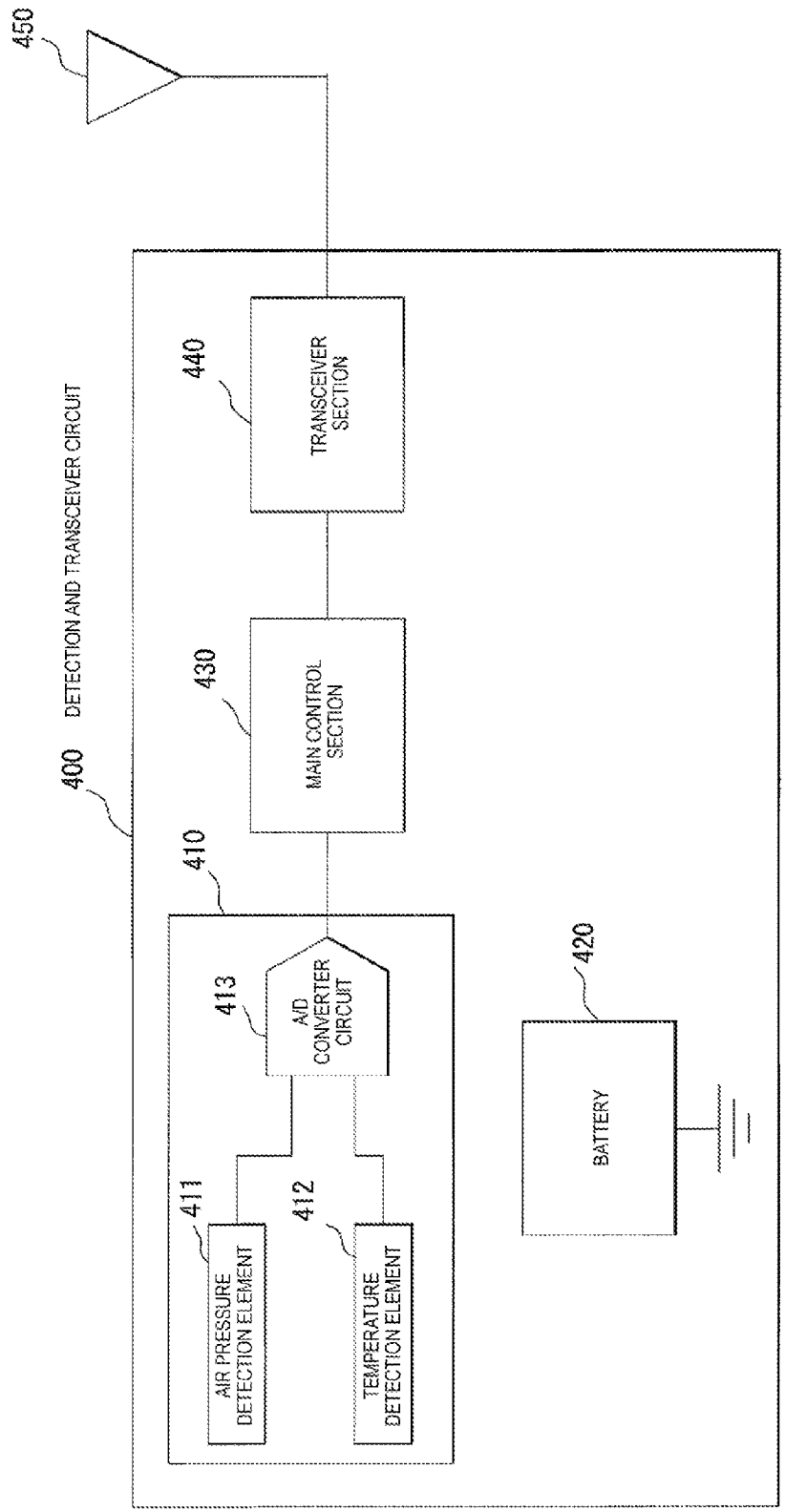
FIG. 10 is a block diagram which illustrates an electric system circuit of the transmission unit in the embodiment of the present technology.

FIG. 1 is an external view which illustrates a transmission device in an embodiment of the present technology, FIG. 2 is a diagram which illustrates a fender which is provided with the transmission device in the embodiment of the present technology, FIG. 3 is a diagram which illustrates a ship provided with a fender in the embodiment of the present technology, FIG. 4 is an external perspective view which illustrates a transmission unit in the embodiment of the present technology, FIG. 5 is a plan view which illustrates a transmission unit in the embodiment of the present technology, FIG. 6 is a side surface cross sectional diagram which illustrates the transmission unit in the embodiment of the present technology, FIG. 7 and FIG. 8 are external perspective views which illustrate a main unit body in the embodiment of the present technology, FIG. 9 is an external perspective view which illustrates main sections of the main unit body in the embodiment of the present technology, and FIG. 10 is a block diagram which illustrates an electric system circuit of the transmission unit in the embodiment of the present technology.

In the drawings, 10 is a transmission device, which is configured by storing one transmission unit 100 inside the cylindrical case 11 formed of an insulating body which transmits radio waves and disposing a 50 cm square conductor plate 200 having a thickness of 5 µm at a position 1 cm below the transmission unit 100. Note that, in consideration of the skin effect of the electromagnetic waves, it is preferable that the thickness of the conductor plate 200 be set to 5 µm or greater in order to obtain favorable electromagnetic wave reflection. In addition, it is preferable that the area of the conductor plate 200 be set to be greater than the projected area of the transmission unit 100 and it is also preferable to have a length or a width which is an integral multiple of ¼ of the wavelength of the frequency of the transmission radio waves.

As illustrated in FIG. 2, the transmission device 10 is stored in an inner section of the fender 1 in the vicinity of a flange 1a of the fender 1, and information on the air pressure and the temperature in the inner section of the fender is transmitted as digital data. As illustrated in FIG. 3, as an application of the fender 1, four of the fenders 1A, 1B, 1C, and 1D are attached to side surfaces of the ship Sp1 in the same manner as the example in the related art and used as a cushioning material when the ship Sp1 and a ship Sp2 are moored to each other.

The transmission unit 100 is configured by storing a main unit body 300 in a substantially rectangular case 130 formed of an insulating body which transmits radio waves.

As illustrated in FIG. 4 to FIG. 6, the case 130 of the transmission unit 100 has a substantially rectangular shape, has protrusion sections for screwing at both end sections in the longitudinal direction thereof, and is configured by a main case body 131 and a lid 132. As illustrated in FIG. 6, a storage space 134 for storing the main unit body 300 is formed in the inner section of the main case body 131 and an opening of the storage space 134 is closed by fixing the lid 132 to the main case body 131 with screws 141. In addition, a vent hole 133 is formed in the lid 132 and air flows into the storage space 134 from the outside via the vent hole 133 even in a state where the lid 132 is fixed to the main case body 131.

As illustrated in FIG. 7 to FIG. 9, two printed wiring boards 351 and 352 having substantially rectangular shapes are disposed in parallel in the main unit body 300 to be spaced at a predetermined interval. The two printed wiring boards 351 and 352 are fixed to each other by columnar connection conductors 354 configuring an antenna 450, by a third printed wiring board 353 for coupling, and the like, which are between the two printed wiring boards 351 and 352. The coil-shaped antenna 450 having a central axis which extends in the width direction of the first and second printed wiring boards 351 and 352 is formed at an end section in the longitudinal direction of the main unit body 300 and electronic components which configure an electronic circuit including a sensor section 410, a battery 420, and the like are attached to the other end side. The printed wiring board 353 for coupling is soldered to each of the two printed wiring boards 351 and 352.

The first printed wiring board 351 and the second printed wiring board 352 are coupled by a plurality of columnar connection conductors 354 which are provided between the first printed wiring board 351 and the second printed wiring board 352 and which fix the one printed wiring board and another printed wiring board to be spaced at a predetermined interval and conductively connect the printed wiring of one printed wiring board and the printed wiring of the other printed wiring board.

A detection and transceiver circuit 400 illustrated in FIG. 10 is formed in the main unit body 300. That is, the detection and transceiver circuit 400 is configured by the sensor section 410, the battery 420, a main control section 430, a transceiver section 440, and the antenna 450.

The sensor section 410 is attached to the surface of the main unit body 300 and configured by an air pressure detection element 411, a temperature detection element 412, and an A/D converter circuit 413. For example, the air pressure and the temperature inside an air chamber of a pneumatic fender are detected by the air pressure detection element 411 and the temperature detection element 412 and the detection results are converted to digital values by the A/D converter circuit 413 and output to the main control section 430.

The battery 420 is coupled with the main unit body 300 by a connection conductor and supplies electrical power to the detection and transceiver circuit 400 which is formed in the main unit body 300.

The main control section 430 is configured by a CPU, a memory, dip switches, and the like which are known in the art, receives the detection results according to the sensor section 410 as digital values, and creates and outputs digital information which includes the digital values to the transceiver section 440. Note that, in addition to the digital values of the detection results described above, the digital information includes unique identification information for the main unit body 300 which is set in advance (written to the memory in advance or set by a dip switch) and a unique number for the main unit body 300 which is set by the dip switch described above. As long as it is possible to set a number which represents any one of 1 to 8 which is the sequence of the transmission described below, the dip switch may be a flat type or may be a rotary type. In addition, in the present embodiment, two dip switches are provided, a number a showing the sequence of the transmission is set in the first dip switch and a value N which is the total number of transmission units 100 which are included in the transmission device 10 is set in the second dip switch.

Furthermore, based on individual unique numbers set in the dip switches, the main control section 430 transmits the individual unique numbers and information on the detection results. Alternatively, the main control section 430 detects the unique number for the main unit body from the received information input from the transceiver section 440, compares the detected number and the unique number set in the dip switch, that is, the number which represents the sequence of the transmission, and transmits the unique number and the information on the detection results based on the comparison results.

The transceiver section 440 switches the transmission and reception based on instructions from the main control section 430, transmits the digital information input from the main control section 430 from the antenna 450 via radio waves of a predetermined frequency, for example, 315 MHz during the transmission, detects the digital signal from the 315 MHz radio waves received via the antenna 450 during the reception, and extracts and outputs the digital information from the detected digital signal to the main control section 430. Note that, the transmission frequency and the reception frequency of the transceiver section 440 are set to the same frequency.

The antenna 450 is a coil-shaped antenna where the resonance frequency is set to the transmission and reception frequency of the transceiver section 440, and is formed by the columnar connection conductors 354 which conductively connect printed wiring 351a provided on the first printed wiring board 351, printed wiring 352a provided on the second printed wiring board 352, the printed wiring of the first printed wiring board 351, and the printed wiring of the second printed wiring board 352, and fix these printed wiring boards 351 and 352 to each other.

Figure 11:
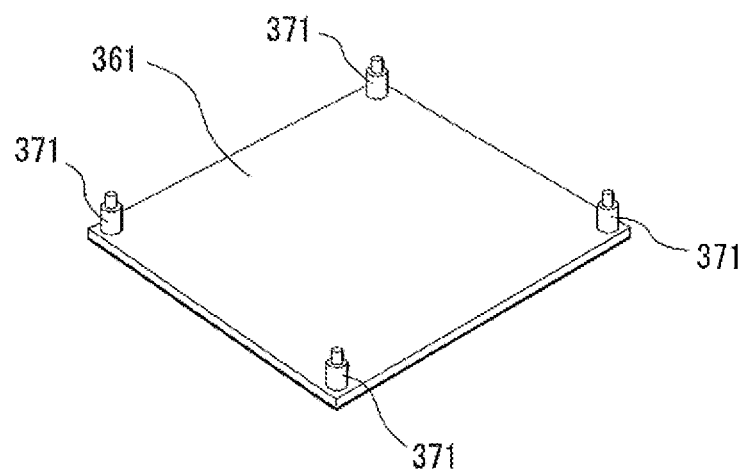
FIG. 11 is an external perspective view which illustrates a planar conductor plate and a holding material in the embodiment of the present technology.
Figure 12:
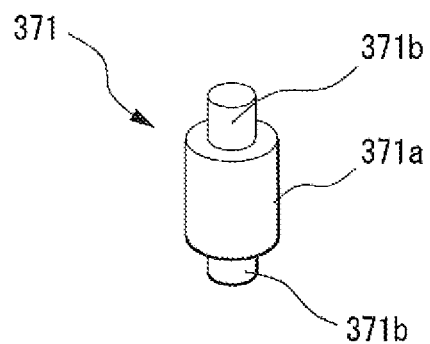
FIG. 12 is an external perspective view which illustrates the holding material in the embodiment of the present technology.

Furthermore, a planar conductor plate 361 having a rectangular shape is fixed by four pieces of holding material 371 on the outer surface of the end section of the second printed wiring board 352. The planar conductor plate 361 is provided at the position of the antenna 450 so as to be parallel with the second printed wiring board 352 which is positioned on the bottom surface side of the main case body 131 when the main unit body 300 is stored in the case 130. The planar conductor plate 361 is fixed by the holding material 371 so as to maintain a predetermined interval with the second printed wiring board 352. The planar conductor plate 361 is set to a reference potential by being conductively connected with a predetermined conductive pattern (conductive pattern connected with the negative electrode of the battery 420) of the second printed wiring board 352. In addition, as illustrated in FIG. 11, the holding material 371 is fixed at the four corners of the planar conductor plate 361. As illustrated in FIG. 12, the holding material 371 has a shape provided with a protrusion section 371b with a cylindrical shape with a diameter smaller than a main body 371a at both ends of the columnar main body 371a.

In a state where the planar conductor plate 361 is attached to the second printed wiring board 352, the resonance frequency of the antenna 450 is set to 315 MHz and the antenna impedance at 315 MHz is 50 ohms. An interval D between the second printed wiring board 352 and the planar conductor plate 361 at this time is set to 1.5 mm by the holding material 371.

Figure 13:
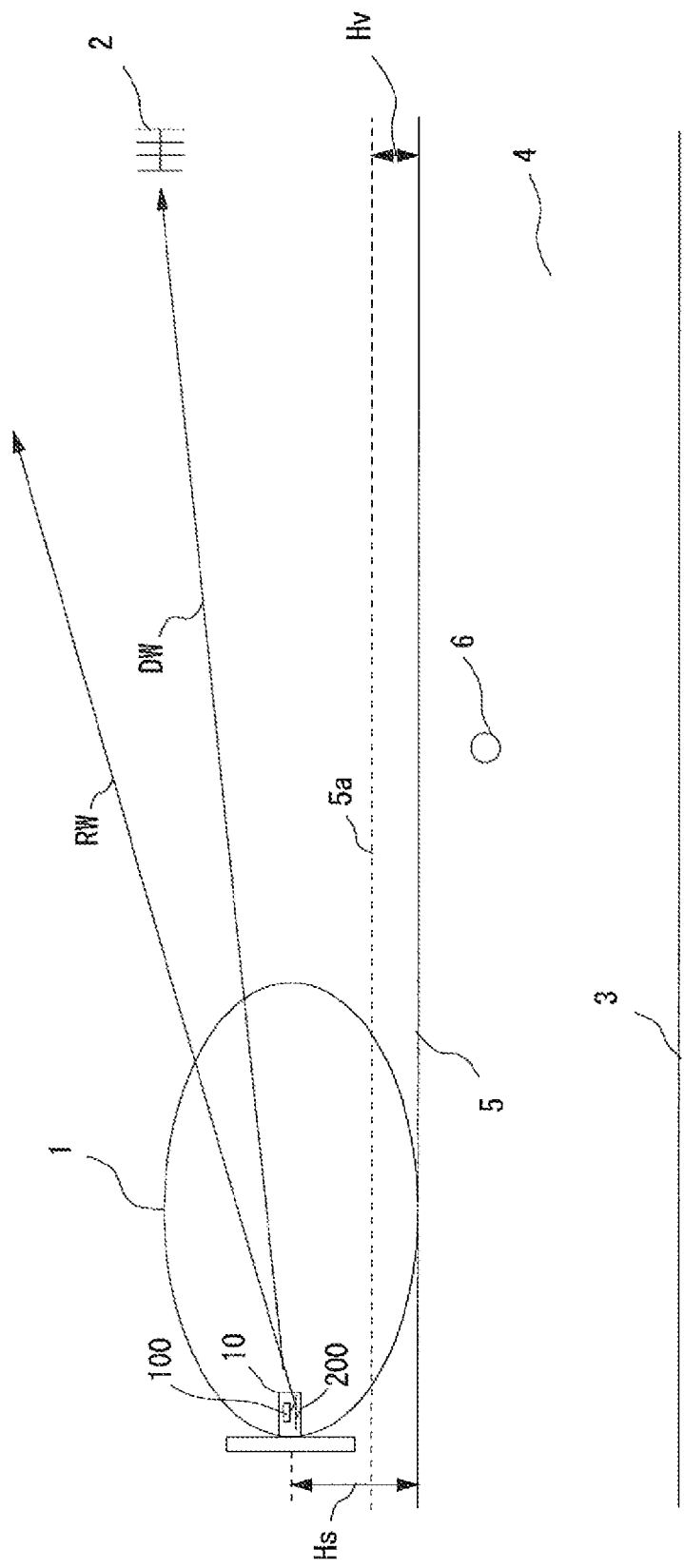
FIG. 13 is a diagram which illustrates direct waves and reflected waves in the embodiment of the present technology.
Figures 14, 15:
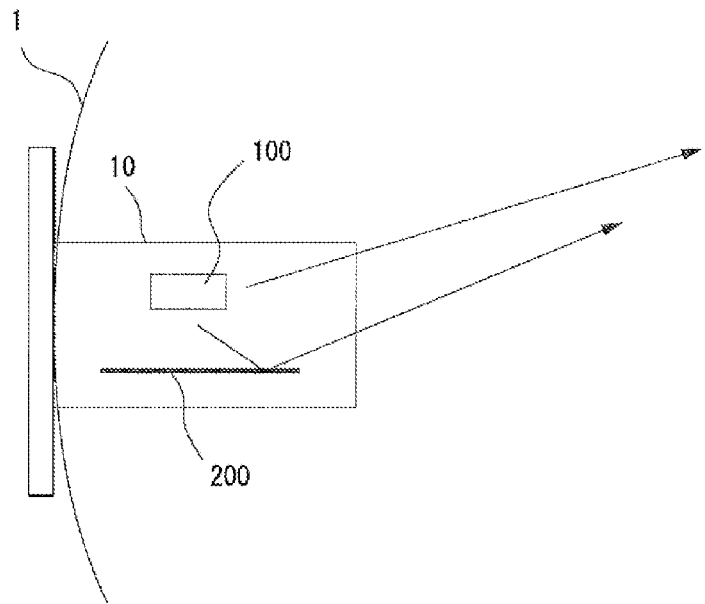
FIG. 14 is a diagram which illustrates direct waves and reflected waves in the embodiment of the present technology.
FIG. 15 is a diagram which shows an increase in reception electric field strength in the embodiment of the present technology.

When attaching the fender 1 which is provided with the transmission device 10 with the configuration described above on the side surface of the ship Sp1, as illustrated in FIG. 13 and FIG. 14, the fender 1 is attached to the side surface of the ship Sp1 such that the conductor plate 200 is positioned between the transmission unit 100 and the sea surface 5. As a consequence, out of the radio waves radiated from the transmission unit 100, only the direct waves DW reach the reception antenna 2, and the radio waves reflected off the sea surface 5, the floating object 6 on the sea, or the seabed 3 in the example of the related art are reflected by the conductor plate 200. Accordingly, the radio waves which reach the reception antenna 2 by being reflected off the sea surface 5, the floating object 6 on the sea, or the seabed 3 in the example of the related art are all reflected by the conductor plate 200. Thus, fluctuations in the reception electric field strength in the reception antenna 2 which occur in accordance with the passage of time due to changes in the sea surface height Hv are eliminated, and it is possible to constantly obtain a stable reception electric field strength.

FIG. 15 shows a comparison result between the reception electric field strength of the example of the related art and the reception electric field strength in the present embodiment. In the example of the related art, the reception electric field strength from the fender 1A was −30.0 dBm, the reception electric field strength from the fender 1B was −30.0 dBm, the reception electric field strength from the fender 1C was −27.9 dBm, and the reception electric field strength from the fender 1D was −25.0 dBm, while in the present embodiment, the reception electric field strength from the fender 1A was −26.4 dBm, the reception electric field strength from the fender 1B was −27.8 dBm, the reception electric field strength from the fender 1C was −23.5 dBm, and the reception electric field strength from the fender 1D was −21.7 dBm. In the present embodiment, compared to the related art, the reception electric field strength in each of the fenders 1A, 1B, 1C, and 1D was increased by 3.6 dBm, 2.2 dBm, 4.4 dBm, and 3.3 dBm.

Figure 16:
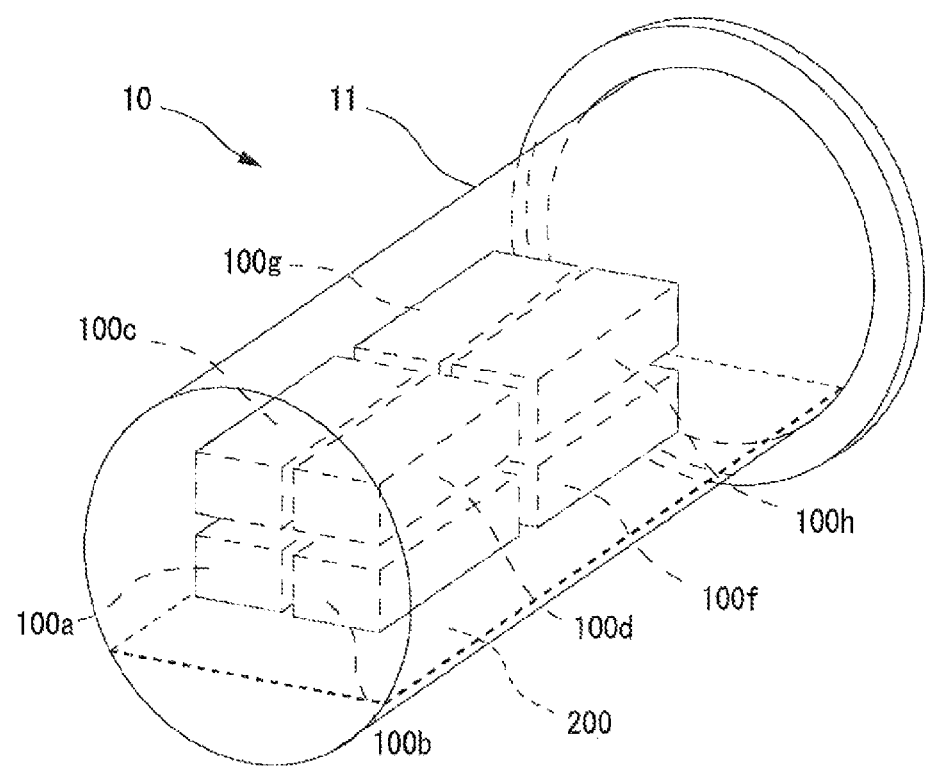
FIG. 16 is a diagram which illustrates another configuration example of the transmission device in the embodiment of the present technology.
Figure 17:
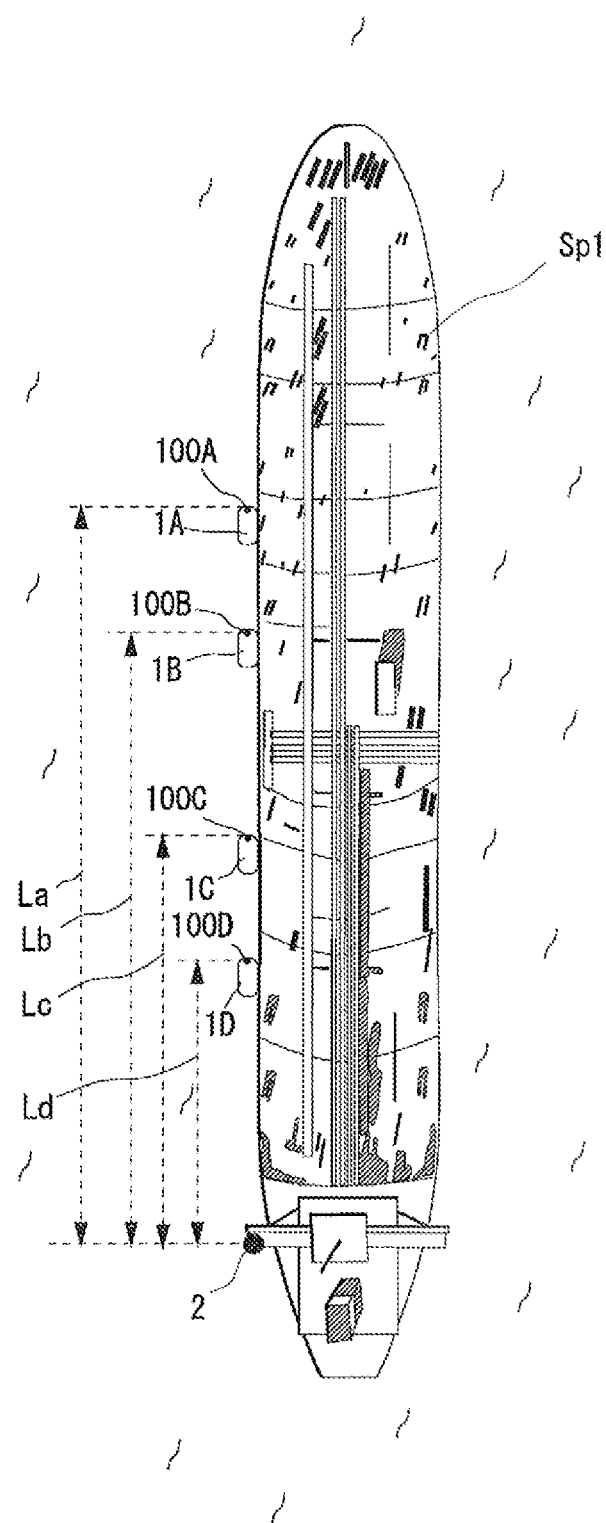
FIG. 17 is a diagram which illustrates a ship provided with a fender in an example of the related art.
Figure 18:
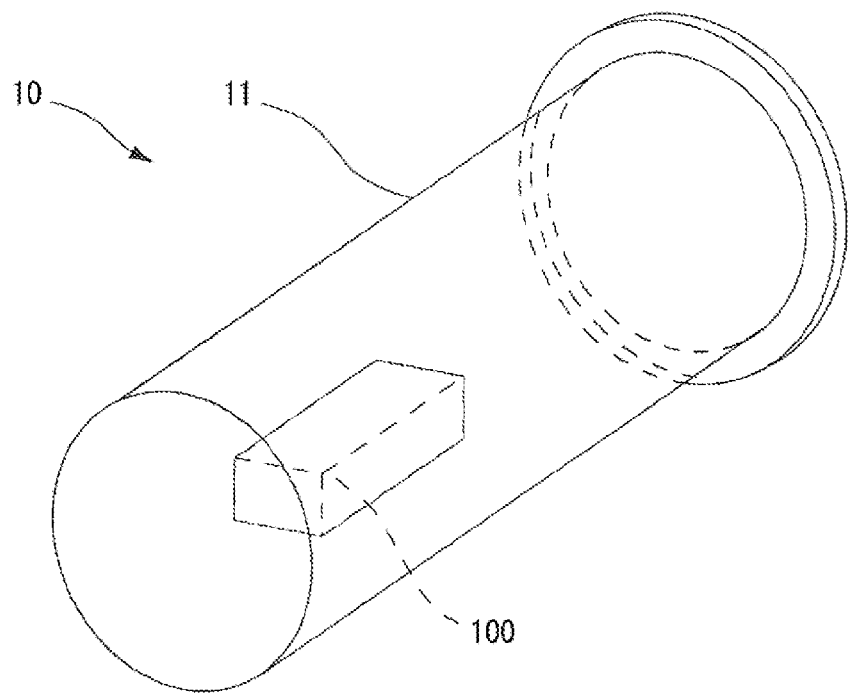
FIG. 18 is an external view which illustrates a transmission device in an example of the related art.
Figure 19:
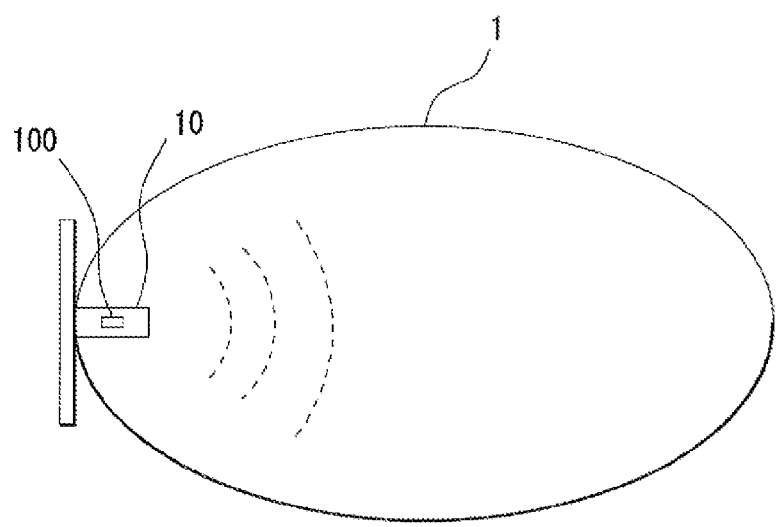
FIG. 19 is a diagram which illustrates a fender which is provided with a transmission device in an example of the related art.
Figure 20:
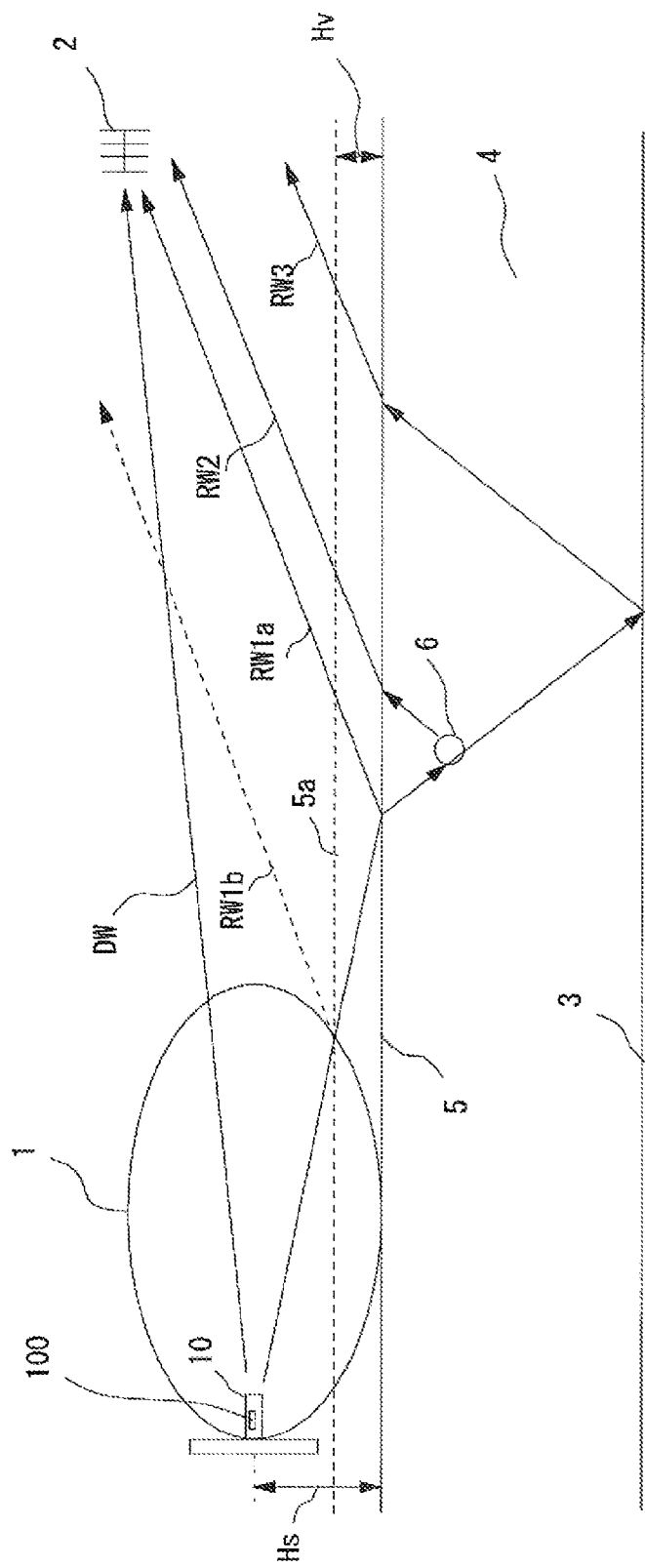
FIG. 20 is a diagram which illustrates direct waves and reflected waves in an example of the related art.
Figure 21:
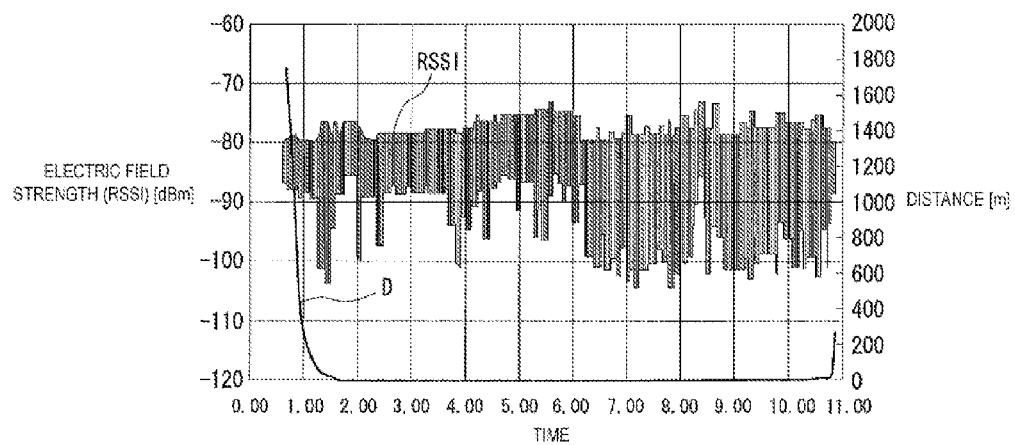
FIG. 21 is a diagram which shows changes in reception electric field strength in an example of the related art.
Figure 22:
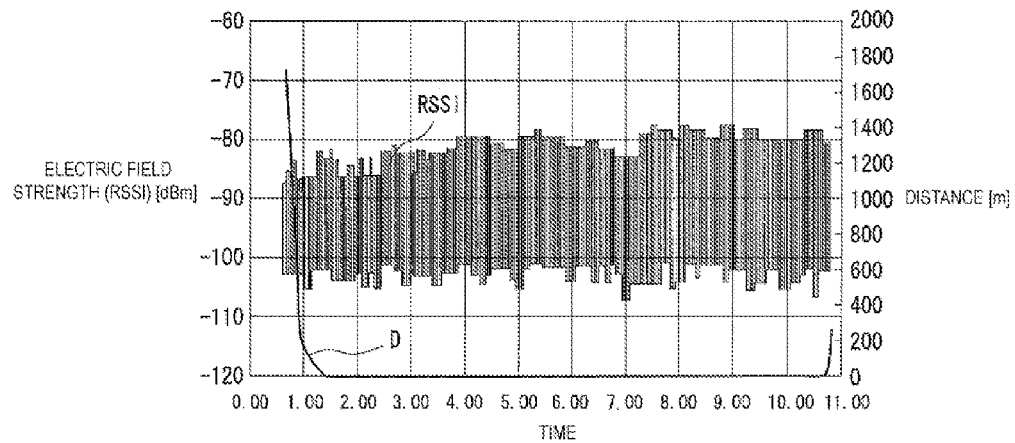
FIG. 22 is a diagram which shows fluctuations in the reception electric field strength in an example of the related art.
Figure 23:
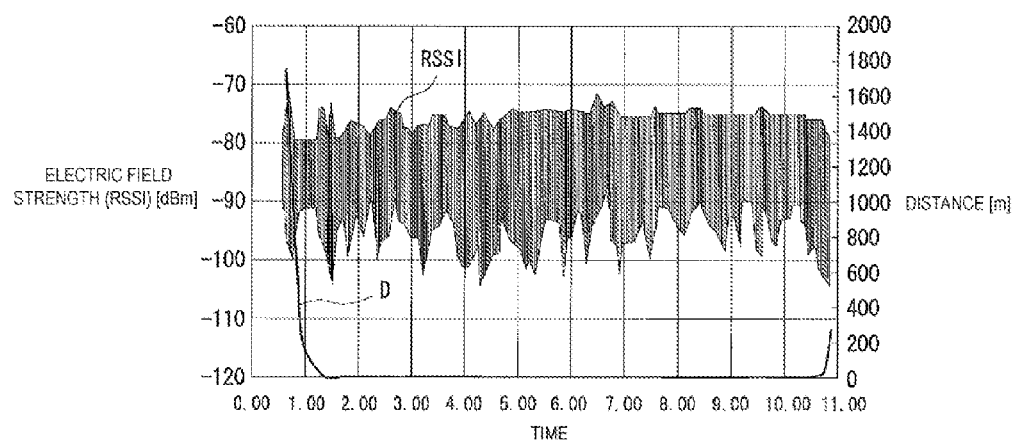
FIG. 23 is a diagram which shows fluctuations in the reception electric field strength in an example of the related art.
Figure 24:
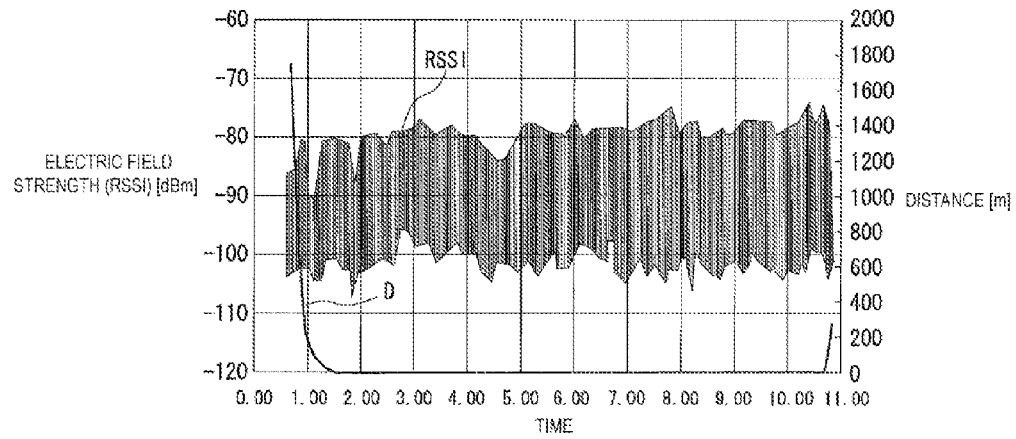
FIG. 24 is a diagram which shows fluctuations in the reception electric field strength in an example of the related art.

Note that, in the embodiment described above, a transmission device which is provided with one transmission unit 100 is configured. However, as illustrated in FIG. 16, even when 8 transmission units 100a to 100h are stored inside the case 11 of the transmission device 10, it is possible to obtain the same effect as described above by disposing the conductor plate 200 below the transmission units 100a to 100h.

The reason for providing eight transmission units 100a to 100 h in this manner is as follows. That is, since each of the transmission units 100a to 100 h corresponds to radio equipment which uses radio waves with a frequency in the 315 MHz band, the provision of predetermined transmission pauses in the wireless transmission is stipulated by law with an object of avoiding interference or the like. According to the law, the transmission pause time is defined as 10 seconds or greater. For this reason, in order for the transmission device 10 to be able to transmit information such as the air pressure, the temperature, or the like at time intervals t which are smaller than 10 seconds, each of the transmission units 100a to 100 h is set to perform transmission of information every time a set time T passes, the set time T is set to 10 seconds, a time t is set to 10/8 seconds (=1.25 seconds) and each of the transmission units 100a to 100 h is set to perform the transmission of information in sequence every time the time t passes.

In addition, in the embodiment described above, the transmission unit 100 which is able to detect both of the air pressure and the temperature is configured. However, a transmission unit which is able to detect either one of the air pressure or the temperature, or another physical quantity, or a transmission unit which transmits other information may be configured.

In addition, the transmission device is attached to a pneumatic fender in the embodiment described above; however, without being limited thereto, it is of course possible to apply the transmission device of the present technology to an object which floats on water such as, for example, a buoy or a lifeboat.

INDUSTRIAL APPLICABILITY

For the transmission device of the present technology, the radio waves which reach the reception antenna by being reflected from the water surface, an object floating on water, or the bottom of water are all reflected using a conductor plate. Thus, fluctuations in the reception electric field strength in the reception antenna which occur in accordance with the passage of time due to fluctuations in the water surface height are eliminated, and it is possible to constantly obtain a stable reception electric field strength.

What is claimed is:

1. A transmission device attached to an object floating in water and for transmitting predetermined information via radio waves, the transmission device comprising:
   a transmission unit including an antenna and a planar conductor plate and radiating transmission radio waves; and
   a conductor plate disposed at a predetermined boundary plane between the transmission unit and a water surface.

2. The transmission device according to claim 1, wherein the conductor plate has an area equal to or greater than an area projected onto a horizontal plane of the antenna.

3. The transmission device according to claim 2, wherein the antenna is a coil-shaped antenna and a coil axis of the antenna is disposed in parallel with respect to a surface of the conductor plate.

4. The transmission device according to claim 2, wherein a thickness of the conductor plate is 5 μm or greater.

5. A fender comprising: the transmission device according to claim 2.

6. The transmission device according to claim 1, wherein the antenna is a coil-shaped antenna and a coil axis of the antenna is disposed in parallel with respect to a surface of the conductor plate.

7. The transmission device according to claim 6, wherein a thickness of the conductor plate is 5 μm or greater.

8. A fender comprising: the transmission device according to claim 6.

9. The transmission device according to claim 1, wherein a thickness of the conductor plate is 5 μm or greater.

10. A fender comprising: the transmission device according to claim 1.

11. The transmission device according to claim 1, wherein the transmission device includes a singular of the transmission unit.

12. The transmission device according to claim 1, further comprising a case supporting the transmission unit, and the conductor plate is positioned outside of the case.

13. The transmission device according to claim 1, wherein the conductor plate has a length greater than a length of the transmission unit.

14. The transmission device of claim 1, wherein the conductor plate has a length at least two times greater than a length of the transmission unit.

* * * * *